United States Patent Office 3,721,918
Patented Mar. 20, 1973

3,721,918
NEGATIVE RESISTANCE SEMICONDUCTOR COUPLED TRANSMISSION LINE APPARATUS

Arye Rosen, Elkins Park, Pa., and James Francis Reynolds, Hightstown, N.J., assignors to RCA Corporation Filed Feb. 24, 1972, Ser. No. 229,145
Int. Cl. H03b 7/14
U.S. Cl. 331—96 8 Claims

ABSTRACT OF THE DISCLOSURE

The boundary conditions for operating an avalanche diode in the anomalous mode are solved by coupling the diode between the center conductor and ground conductor of a first TEM mode transmission line. Center conductors of additional TEM mode transmission lines, providing different electrical parameters, are capacitively coupled to different sections of the center conductor of the first TEM mode transmission line.

DESCRIPTION OF THE PRIOR ART

A coupled transmission line structure using an avalanche diode operative in the anomalous mode has been disclosed by Assour, Rosen and Reynolds in an allowed U.S. copending patent application, Ser. No. 68,671, filed Sept. 1, 1970, now Pat. No. 3,659,222 and assigned to the same assignee as the present invention. The boundary conditions for operating an avalanche diode in the anomalous mode require the utilization of diode generated energy at frequencies harmonically related to the desired operating frequency. In the prior art a capacitor or some form of frequency filtering has been used to provide a reactive termination to the diode at the necessary higher order frequencies. Usually such circuits are not optimized at a particular harmonic frequency. The result is a device having a relatively narrow dynamic bandwidth and low operating efficiency.

SUMMARY OF THE INVENTION

The terminals of a negative resistance semiconductive device are connected in shunt between the center conductor a first TEM mode transmission line and ground potential at a relatively high microwave voltage point. The first transmission line center conductor has first and second open circuited ends. A second TEM mode transmission line center conductor is capacitively coupled to the center conductor of the first transmission line, the second center conductor being parallel to the first center conductor. The second center conductor has an electrical length from a ground connected end to an open circuited end of $\lambda_1/4$, where $\lambda_1$ is the wavelength at a desired operating frequency. The alignment of the first and second center conductors define opposite halves of a first rectangle with the ground connected end of the second center conductor adjacent to the first open circuited end of the first center conductor. A third TEM mode transmission line center conductor is capacitively coupled to the first center conductor, the third center conductor being parallel to the first center conductor. The third center conductor has an electrical length from a first open circuited end to a second open circuited end of $\lambda_2/4$, where $\lambda_2$ is the wavelength at a harmonic of the desired operating frequency. The alignment of the first and third center conductors define opposite halves of a second rectangle with the first open circuited end of the third center conductor adjacent to the second open circuited end of the first center conductor. The first and second rectangles defined by the first, second and third center conductors are non-contiguous. A reverse bias signal exceeding a predetermined threshold magnitude is applied between the device terminals, causing the device to be triggered into operation.

BRIEF DESCRIPTION OF THE DRAWINGS

Referring to FIGS. 1A and 1B, schematics of a broadband microwave apparatus using an avalanche diode, D, operating in the anomalous or high efficiency mode are shown. The diode D is connected via electrodes 10 and 12 between the center conductor 11 of a TEM mode transmission line and ground. The center conductor 11 of a TEM mode transmission line is usually separated from a ground conductor by dielectric material, air or a combination of both. For the sake of clarity, a ground conductor is not shown in the drawing. A ground conductor would be provided in the embodiment of FIGS. 1A and 1B as taught in the present state of the art, as illustrated in FIG. 3 of the drawing by way of example only. Preferably, the diode electrode having the better thermal path is connected to ground. By way of illustration, the cathode 12 of diode D is connected to ground and the anode 10 of diode D is connected to the transmission line center conductor 11. A D.C. reverse bias signal is coupled across the electrodes 10 and 12 of diode D through a biasing circuit that prevents the leakage of microwave energy into the D.C. bias supply, not shown. Such a biasing circuit may be a series combination of a high inductance lead, $L_1$, and a bypass capacitor, $C_1$. One end of the high inductance lead, $L_1$, is connected to center conductor 11 and therefore electrically connected to anode 10 of diode D. The other end of the inductor $L_1$ is connected to one terminal of the bypass capacitor, $C_1$. The other terminal of the bypass capacitor, $C_1$, is connected to a point at ground potential. At microwave frequencies, the bypass capacitor, $C_1$ presents a low impedance path to ground. The D.C. bias signal is applied to the junction between inductance $L_1$ and capacitance $C_1$.

Figure 1A:
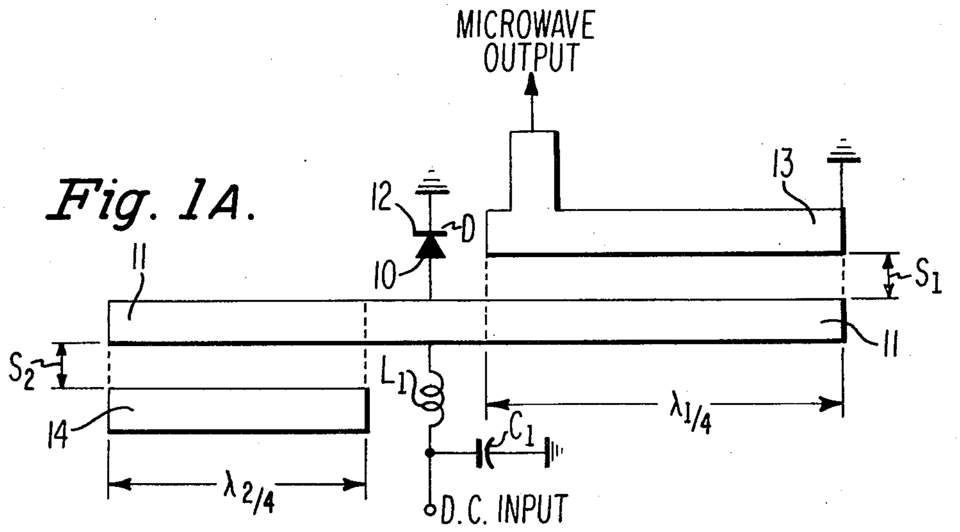
FIG. 1A is a schematic of a microwave oscillator providing energy at the fundamental frequency of the anomalous mode of avalanche diode operation.

An avalanche diode is a negative resistance semiconductive device capable of converting D.C. energy into microwave energy. The application of a reverse bias signal, exceeding a predetermined breakdown voltage, across the diode electrodes causes a displacement current or electric field in the depletion layer of the diode's semiconductive material. Carriers are created at the point of maximum electric field within the depletion layer. The carrier density is increased when the carriers collide with other atoms and create more carriers. The displacement current can also be considered as a wavefront, moving with a specific wave velocity, provided the displacement current has a very fast rise time. If the wave velocity of the displacement current is greater than the saturation velocity of the carriers, a high density of holes and electrons or carriers will be left in the wake of this wavefront. As a result of the concentration of holes and electrons, the electric field is reduced and the velocity of the carriers is diminished, leading to the formation of a dense plasma. Microwave energy is obtained from an avalanche diode by extraction of energy from the trapped plasma.

The necessary fast rise time of the displacement current can be achieved by utilizing the high frequency signals created by ionization at low currents. The high frequency signals trigger the avalanche diode into a high efficiency mode of operation, the anomalous mode. The avalanche diode then emits energy at a frequency which is related to the ratio of the depletion layer width to the velocity of the carriers in the plasma, and the design of the complementary microwave circuitry. The diode's complementary microwave circuitry is designed to match the complex impedance of the diode to a terminating load impedance at a desired frequency of operation. The microwave circuit is also designed to present a reactive impedance at all other frequencies. For optimum generation of microwave energy, an avalanche diode operating in the anomalous mode is usually located within a microwave circuit at a relatively high microwave voltage point.

At least two additional TEM mode transmission line center conductors 13, 14 are capacitively coupled to the open circuited center conductor 11. The gaps $S_1$ and $S_2$ determine the magnitude of distributed capacitive coupling. Each of the additional center conductors 13, 14 are parallel and adjacent to different portions of the open circuited center conductor 11. Opposite sides of a first rectangle, shown by the dotted lines, are formed by center conductor 13 and the adjacent portion of the open circuited center conductor 11. Opposite sides of a second rectangle, shown by the dotted lines, are formed by center conductor 14 and its adjacent portion of center conductor 11. The electrode 10 of diode D is connected to the open circuited center conductor 11 midway between the configurations formed by the additional center conductors 13, 14 and the adjacent portions of the open circuited center conductor 11. The additional center conductors 13, 14 are designed to match the complex impedance of diode D to a terminating load impedance, not shown, at a desired operating frequency and to present an acceptable reactive termination at a predetermined harmonic of the desired operating frequency. The reactive termination of energy at harmonically related frequencies is necessary for sustaining the oscillations of an avalanche diode in its anomalous mode of operation. As in the case of the transmission line including center conductor 11, the transmission lines including the center conductors 13 and 14 each require a suitable ground conductor, not shown. In practice, a single ground conductor may be used for the center conductors 11, 13, 14.

By way of illustration, the apparatus in FIG. 1A is an oscillator tuned to provide energy at the fundamental frequency of the anomalous mode of avalanche diode operation. The end of center conductor 13 adjacent to the open circuited end of center conductor 11 is connected to ground. The electrical length of center conductor 13 is substantially $\lambda_1/4$, where $\lambda_1$ is the wavelength at the fundamental frequency of operation. The characteristic impedances of center conductors 11 and 13, the capacitive coupling between center conductors 11 and 13, and the electrical length of center conductor 13 match the impedance of diode D to a terminating load impedance at the fundamental frequency. The terminating load impedance, not shown, is coupled to center conductor 13.

Center conductor 14 is open circuited at both ends and has an electrical length of substantially $\lambda_2/4$, where $\lambda_2$ is the wavelength at the second harmonic of the fundamental frequency. The characteristic impedances of center conductors 11 and 14, the capacitive coupling between center conductors 11 and 14, and the electrical length of center conductor 14 presents a desired reactive termination to diode D at the second harmonic of the fundamental frequency. A relatively high microwave voltage is established at the connection point of diode D to center conductor 11 by the electrical interactions between center conductor 11 and center conductors 13, 14. The electrical interactions between additional center conductors 13, 14 and center conductor 11 also present the necessary reactive termination to diode D at all frequencies other than the desired frequency of operation. Additional lumped element capacitors connected between center conductor 11 and center conductors 13 or 14 may be used to supplement the magnitude of the distributed capacitive coupling.

Figures 1B, 2:
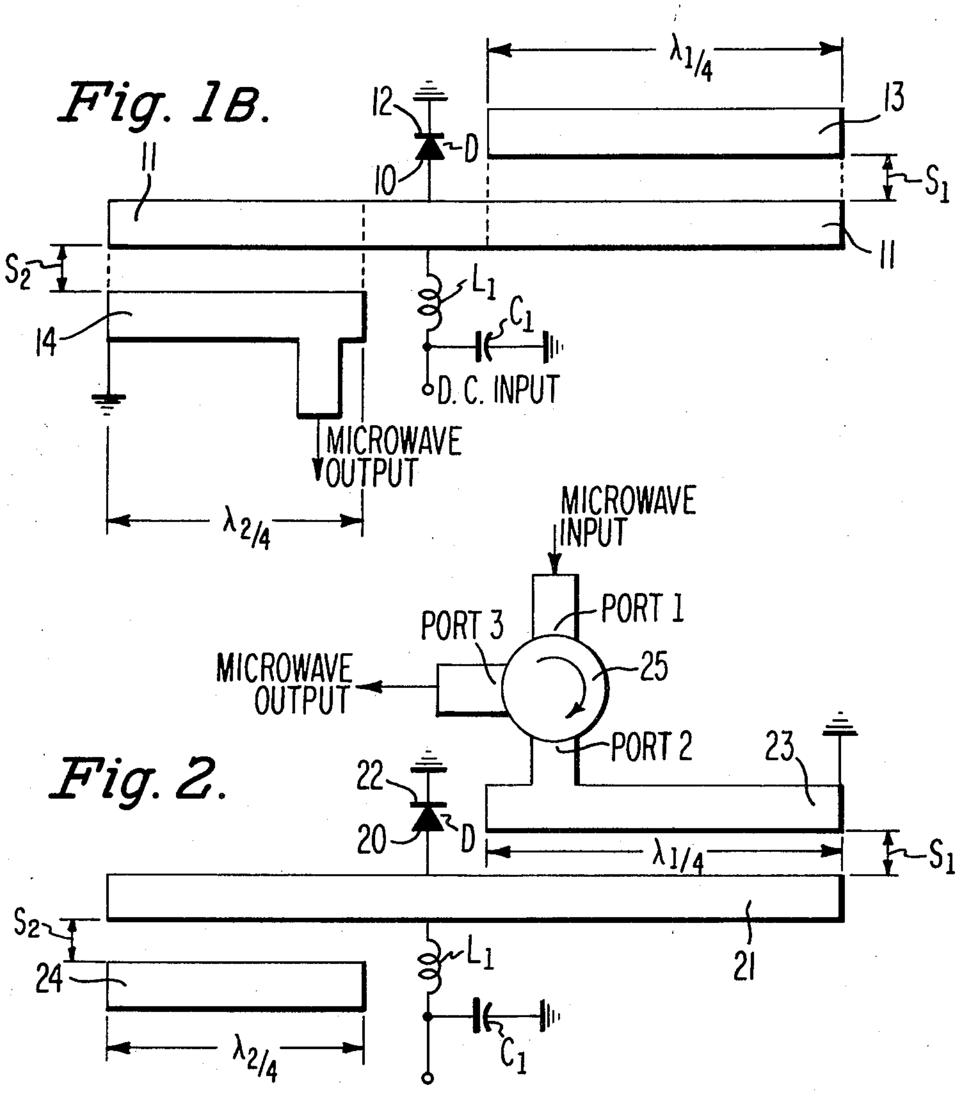
FIG. 1B is a schematic of a microwave oscillator providing energy at the second harmonic of the fundamental frequency of the anomalous mode of avalanche diode operation.
FIG. 2 is a schematic of an amplifier embodiment of the present invention.

The additional center conductors 13, 14 can also be arranged to provide energy to a terminating load impedance at the second harmonic of the fundamental frequency as shown in FIG. 1B. Under these operating conditions, the short circuit is removed from center conductor 13. The electrical length of center conductor 13 is substantially $\lambda_1/4$, where $\lambda_1$ is the wavelength at the fundamental frequency of operation. Center conductor 13 now reacts with center conductor 11 to present a desired reactive termination to diode D at the fundamental frequency. The end of center conductor 14 adjacent to the open circuited end of center conductor 11 is connected to ground. Center conductor 14 now reacts with center conductor 11 to present an impedance match to a terminating load impedance at the second harmonic of the fundamental frequency. The terminating load impedance, not shown, is coupled to center conductor 14. Thus, the oscillator in FIGS. 1A and 1B can be easily tuned to operate at either the fundamental frequency of the diode generated energy or the second harmonic of the fundamental frequency. Energy at other harmonically related frequencies generated by diode D can be coupled from center conductor 14, where the electrical length of center conductor 14 is $\lambda_n 4$, where $\lambda_n$ is the wavelength at the desired harmonically related frequency.

Referring to FIG. 2, there is shown a schematic of an amplifier embodiment of the present invention. The amplifier comprises the structure of FIG. 1 combined with a directional circulator 25. A D.C. reverse bias signal is applied across the electrodes 20, 22 of diode D via the $L_1$ $C_1$ biasing circuit. The magnitude of the applied D.C. bias signal is slightly less than the diode threshold voltage necessary for operation. A microwave signal at a frequency $f_0$ is coupled to port 1 of the circulator 25. The directional properties of the circulator 25 transmit the applied microwave signal to port 2 of the circulator 25. Port 2 of the circulator 25 is connected to center conductor 23 near its open circuited end. The energy transmitted from port 2 of the circulator 25 to center conductor 23 is capacitivity coupled to center conductor 21 and diode D. The separation, $S_1$, between center conductors 23 and 21 determines the magnitude of capacitive coupling. The magnitude of the combined D.C. bias and microwave signal exceeds the threshold level of diode D, and it is triggered into its anomalous mode of operation. The characteristic impedance of center conductors 23 and 21, the magnitude of capacitive coupling between center conductors 23 and 21 and the electrical length of center conductor 23 presents a reciprocal transformation from the impedance of the circulator 25 to the complex impedance of the diode D at the fundamental frequency of operation. The energy generated by diode D at frequency $f_0$ is capacitively coupled from center conductor 21 by center conductor 23 and transmitted to port 2 of the circulator 25. The directional properties of the circulator 25 transmits the energy from port 2 to a load terminating port 3.

Center conductor 24 is open circuited at both ends and has an electrical length of $\lambda_2/4$, where $\lambda_2$ is the wavelength at the second harmonic of the input frequency, $f_0$. The characteristic impedance of center conductors 24 and 21, the magnitude of capacitive coupling between center conductors 24 and 21 and the electrical length of center conductor 24 is designed to provide the diode with a desirable reactive termination at the second harmonic of the fundamental frequency of operation. The combination of center conductors 23 and 24 provide the necessary reactive termination for operating diode D in its anomalous mode. The addition of center conductor 24 enhances the dynamic operating bandwidth and efficiency of the amplifier. The dynamic bandwidth of the amplifier may be increased by capacitively coupling additional center conductors, not shown, to center conductor 23. The additional center conductors would have a short circuit at the same end as center conductor 23 and staggered electrical lengths slightly different from $\lambda_1/4$, where $\lambda_1$ is the wavelength at the input frequency $f_0$.

Figure 3:
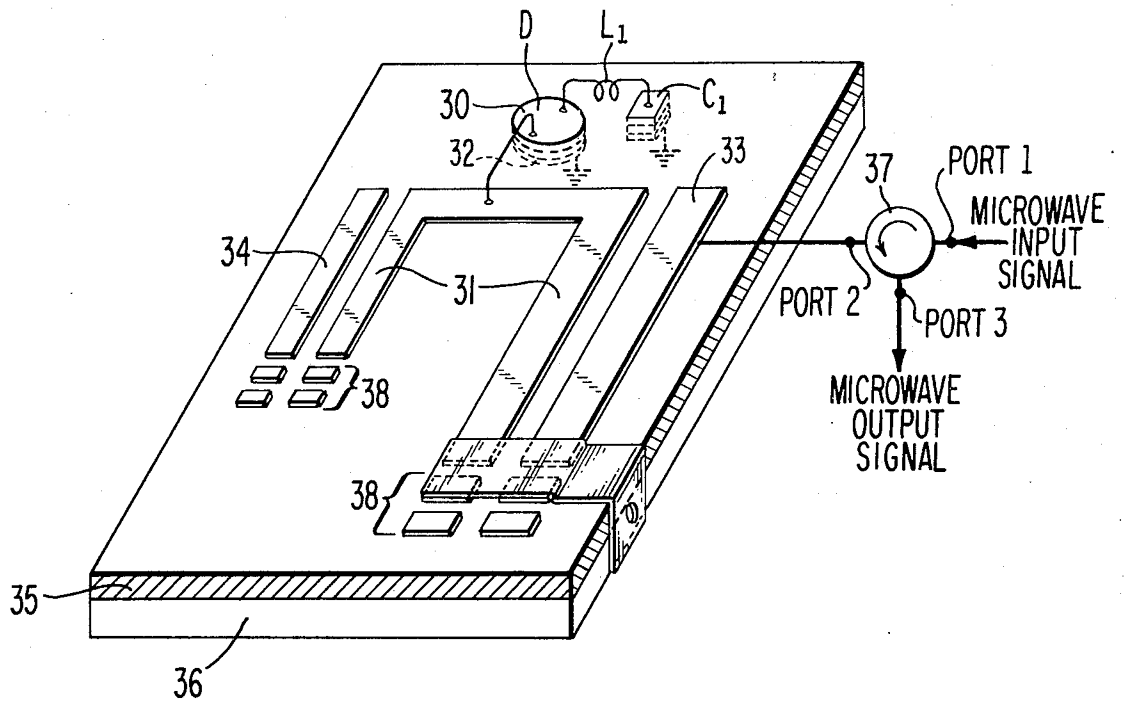
FIG. 3 is an isometric drawing of a microwave amplifier constructed according to the disclosed invention.

Referring to FIG. 3, there is shown an isometric drawing of a microwave amplifier constructed according to the disclosed invention. The amplifier is designed using microstrip transmission line. The center conductors 31, 33 and 34 are conductive strips on the top surface of a dielectric substrate 35 having a dielectric constant of 2.55, for example. The thickness of the dielectric substrate is .028 inch. The bottom surface of the dielectric substrate 35 is in contact with a ground planar conductor 36. The electrical lengths of center conductor 33 and the adjacent portion of center conductor 31 is substantially $\lambda_1/4$, where $\lambda_1$ is the wavelength at the frequency, $f_0$, of the input microwave signal coupled to port 1 of the ferrite directional circulator 37. Port 2 of the directional circulator is connected to center conductor 33. The electrical lengths of center conductor 34 and the adjacent portion of center conductor 31 is substantially $\lambda_2/4$, where $\lambda_2$ is the wavelength at the second harmonic of the input frequency, $f_0$. The electrical lengths of center conductors 31, 33 and 34 can be varied by making electrical contact between center conductors 31, 33, 34 and one or more of the conductive strips 38 at the ends of center conductors 31, 33 and 34.

The even mode impedance, $Z_{0e}$, of center conductor 33 and the adjacent portion of center conductor 31 is 40 ohms. The add mode impedance, $Z_{00}$, of center conductor 33 and the adjacent portion of center conductor 31 is 30 ohms. The even mode impedance, $Z_{0e}$, of center conductor 34 and the adjacent portion of center conductor 31 is 60 ohms. The add mode impedance, $Z_{00}$, of center conductor 34 and the adjacent portion of center conductor 31 is 40 ohms. The magnitude of even and odd mode impedances determine the width and separation between center conductors 31, 33 and 34.

The .020 inch diameter silicon avalanche diode, D, used in the amplifier was fabricated by boron diffusion in n-on-$n^+$ epitaxial layers. The $p^+$ layer thickness is substantially 4 $\mu$m. The n layer resistivity is substantially 6 ohm-cm. with a thickness of 4 $\mu$m. The breakdown voltage of the diode is substantially 100 volts. The magnitude of the D.C. reverse bias signal applied across the diode electrodes 30 and 32 via the $L_1$ $C_1$ biasing circuit is less than the diode threshold voltage necessary for operation. The directional properties of the circulator 37 transmit the microwave input signal centered at 2.75 gHz. from port 1 to port 2 of the circulator 37. The design of the even and odd mode impedances of center conductors 31 and 33 provide an effective transformation from the circulator 37 input impedance to the complex impedance of diode D over a dynamic fractional bandwidth of 12%. This impedance transformation allows the input microwave signal to combine with the applied D.C. signal and trigger diode D into operation. The diode generated energy is transmitted from port 2 of circulator 37 to a load impedance terminating port 3. The diode D generated 35 watts of microwave power at 2.75 gHz. The gain of the amplifier is 4.15 db and the efficiency of operation is 22%.

One embodiment of the invention has been shown and described in FIG. 3 only by way of example. Various other embodiments and modifications thereof will be apparent to those skilled in the art, and will fall within the scope of invention as defined in the following claims.

What is claimed is:

1. In combination, a first transmission line having a center conductor with first and second open circuited ends, a second transmission line having a center conductor with a ground connected end and an open circuited end, said second center conductor being capacitively coupled to and in parallel with a portion of said first center conductor with said ground connected end of said second center conductor adjacent said first open circuited end of said first center conductor, a third transmission line having a center conductor with first and second open circuited ends, said third center conductor being capacitively coupled to and in parallel with a portion of said first center conductor non-overlapping with that portion of said first center conductor capacitively coupled to said second center conductor, a two-terminal negative resistance semiconductor device connected between a point of ground potential and a point on said first center conductor between the respective portions thereof coupled to said second and third center conductors, means to apply signal energy to said device sufficient to operate said device at a desired frequency with said device being connected to a high voltage point on said first center conductor, the characteristic impedances of said first, second and third transmission lines, the capacitive coupling between said first and second center conductors and between said first and third center conductors, and the electrical lengths of said second and third center conductors being determined so that the one of said second or third center conductors with said first center conductor presents a desired reactive termination to said device at said desired frequency and the other one of said second or third center conductors with said first center conductor presents a desired reactive termination to said device at a harmonic of said desired frequency.

2. An apparatus according to claim 1, wherein said signal energy includes a reverse D.C. voltage having a magnitude sufficient to operate said device at said desired frequency.

3. An apparatus according to claim 1, wherein said signal energy includes the sum of the magnitudes of a reverse D.C. voltage and a microwave signal at said desired frequency, whereby said device is triggered into amplifying said microwave signal.

4. An amplifier according to claim 3, further comprising:

means for directively coupling both an input microwave signal to said first transmission line and an output microwave signal from said first transmission line to a terminating load impedance.

5. An amplifier according to claim 4, wherein said directive coupling means include a directional circulator having a first directive path from a first terminal to a second terminal connected to said second transmission line and a second directive path from said second terminal to a load impedance terminated third terminal.

6. An apparatus according to claim 1, wherein said desired frequency is the fundamental frequency generated by said device, said electrical length of said third center conductor being $\lambda_2/4$, where $\lambda_2$ is the wavelength at the second harmonic of said fundamental frequency, and said electrical length of said second center conductor being $\lambda_1/4$, where $\lambda_1$ is the wavelength at said fundamental frequency.

7. An apparatus according to claim 1, wherein said desired frequency of said apparatus is the second harmonic of the fundamental frequency generated by said device, said electrical length of said third center conductor being $\lambda_1/4$, where $\lambda_1$ is the wavelength at said fundamental frequency, and said electrical length of said second center conductor being $\lambda_2/4$, where $\lambda_2$ is the wavelength at said second harmonic of said fundamental frequency.

8. An apparatus operative at a desired frequency comprising, a two-terminal negative resistance semiconductive device, a first TEM mode transmission line including a center conductor having first and second open circuited ends, a second TEM mode transmission line including a center conductor having an electrical length from a ground connected end to an open circuited end of $\lambda_1/4$, where $\lambda_1$ is the wavelength at said desired operating frequency, said first and second center conductors being capacitively coupled together and in parallel defining opposite halves of a first rectangle with said ground connected end of said second center conductor adjacent to said first open circuited end of said first center conductor, a third TEM mode transmission line including a center conductor having an electrical length from a first open circuited end to a second open circuited end of $\lambda_n/4$, where $\lambda_n$ is the wavelength at a harmonic of said desired operating frequency, said first and third center conductors being capacitively coupled together and in parallel defining opposite halves of a second rectangle with said first open circuited end of said third center conductor adjacent to said second open circuited end of said first center conductor, said second rectangle being non-contiguous with said first rectangle, means for connecting said device terminals in shunt between said first center conductor and a point at ground potential at a relatively high microwave voltage point between the portions of said first center conductor capacitively coupled to said respective second and third center conductors, means for applying a reverse bias signal exceeding a predetermined threshold magnitude across said device terminals, whereby said device is triggered into operation.

References Cited

UNITED STATES PATENTS

| | | | |
|---|---|---|---|
| 3,659,222 | 4/1972 | Assour et al. | 331—107 R X |
| 3,683,298 | 8/1972 | Kawamoto | 331—101 X |

ROY LAKE, Primary Examiner

S. H. GRIMM, Assistant Examiner

U.S. Cl. X.R.

330—5, 34, 56, 61 A; 331—99, 107 R; 333—73 S, 84 M